Figure 1:
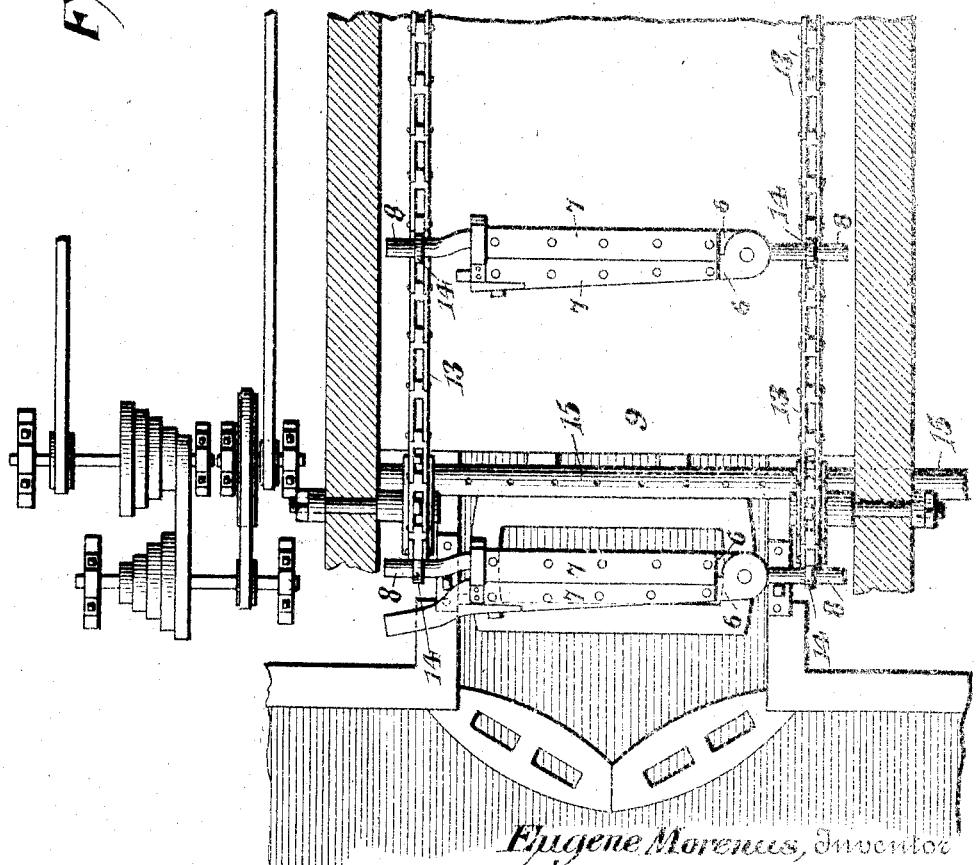

No. 883,039. PATENTED MAR. 24, 1908.
E. MORENUS.
METHOD OF PRODUCING GLASS.
APPLICATION FILED MAR. 5, 1907.

2 SHEETS—SHEET 1.

Witnesses
Jas. G. McCathran
Louis G. Julihn

Eugene Morenus, Inventor
By
C. G. Riggers
B. G. Foster
Attorneys

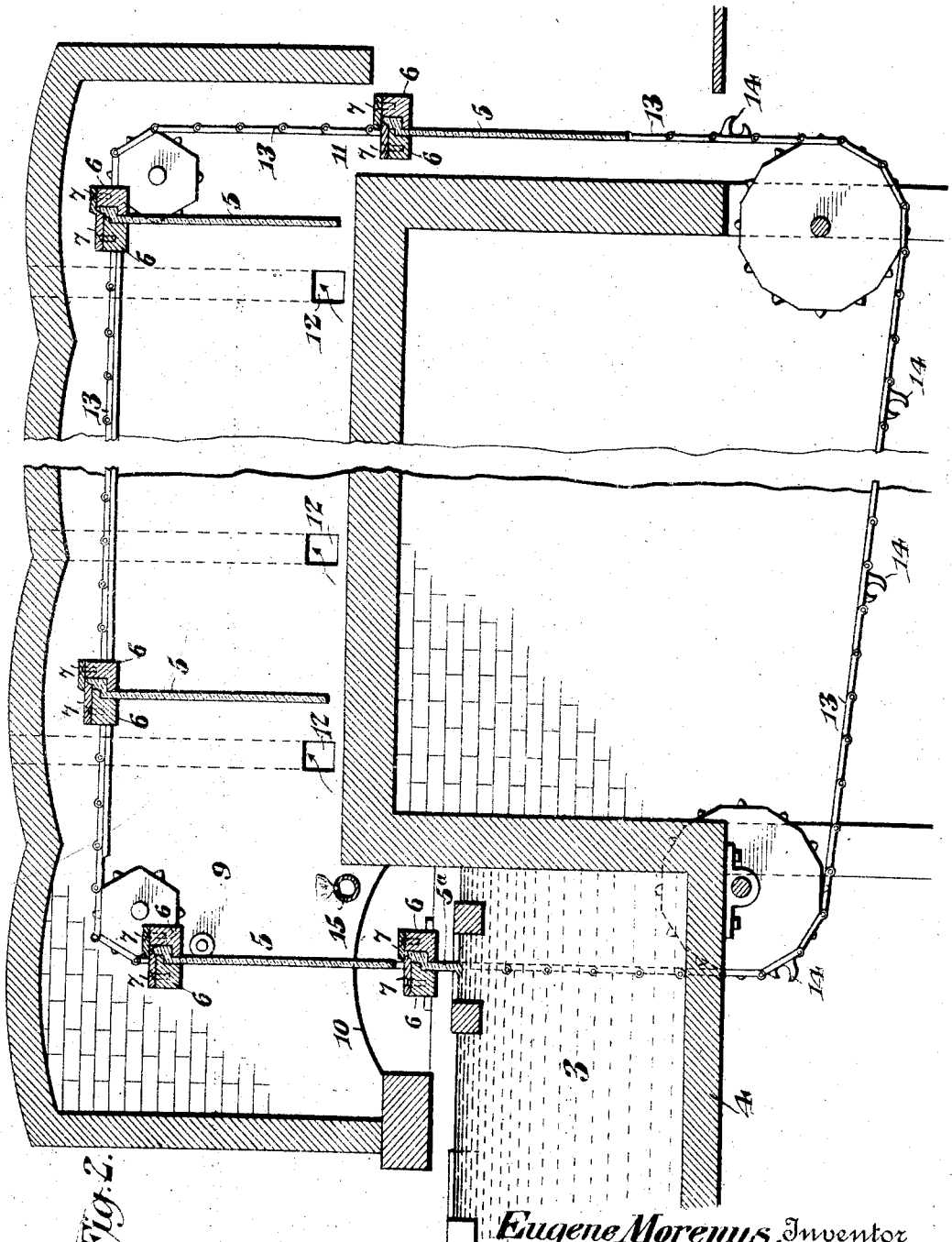

UNITED STATES PATENT OFFICE.

EUGENE MORENUS, OF CLEVELAND, NEW YORK, ASSIGNOR OF ONE-HALF TO GRANVILLE W. MORENUS, OF KANE, PENNSYLVANIA.

METHOD OF PRODUCING GLASS.

No. 883,039.

Specification of Letters Patent.

Patented March 24, 1908.

Application filed March 5, 1907. Serial No. 360,649.

*To all whom it may concern:*

Be it known that I, EUGENE MORENUS, a citizen of the United States, residing at Cleveland, in the county of Oswego and State of New York, have invented certain new and useful Improvements in Methods of Producing Glass, of which the following is a specification.

The principal object of the present invention is to produce by a simple, novel and practicable method, sheets of glass formed or drawn directly from a molten body of the same.

In the drawings:—Figure 1 is a plan view of one type of mechanism for carrying out the invention. Fig 2 is a vertical longitudinal sectional view therethrough.

Similar reference numerals designate corresponding parts in all the figures of the drawings.

In carrying out the invention, a body of molten glass, as 3, is placed in a suitable tank or reservoir 4, and from the same are drawn sheets 5. As shown in Fig. 2, a bait $5^a$ is first clamped in a pair of jaws 6 having shears or cutting blades 7 fastened to their upper edges. These jaws are provided at their ends with gudgeons 8. Directly over the end of the tank or reservoir 4 from which the glass is drawn, is located one end of an annealing chamber or leer 9, the inlet to said end being through the bottom, as shown at 10. The outlet from said annealing chamber or leer is through the bottom at the opposite end, as shown at 11. Heat flues have inlets 12 communicating with the lower portion of the annealing chamber. Carrier chains 13 pass upwardly on opposite sides of the tank or reservoir 4, and through the annealing chamber or leer, said chains being provided with hooks 14 at suitable intervals that engage the gudgeons 8. A heater 15 is located the mouth of the annealing chamber or leer directly below the path of movement of the sheets carried by the chains.

The bait $5^a$, as already described, is clamped between the jaws 6 and the clamp placed in position over the molten body 3 of material so that the gudgeons 8 will be engaged by a pair of hooks 14 on the chains 13. The chains being driven by any suitable means, it will be evident that the sheet of glass will be drawn from the body upwardly into the inlet end of the annealing chamber or leer. The upper portion of the sheet passes into a temperature that permits said upper portion to harden, but the lower portion in close proximity to the molten body, remains in a plastic condition. Another pair of combined clamps and shears is then passed on opposite sides of the sheet, and the jaws are brought together, thereby severing the plastic portion of the sheet in close proximity to the molten body, leaving another bait $5^a$ in the second clamp. This second clamp is allowed to remain stationary momentarily, while the movement of the severed sheet is continued. As a result, the severed or lower end thereof will move away from the second clamp and passed horizontally through the annealing chamber. At the same time, its lower end will pass over and within range of the heat from the burner 15, which will have the effect of reheating the lower portion to weld the same, should it become fractured or cracked by engagement with the comparatively cold clamps and shears. As the sheet passes on through the chamber 9, it will be gradually cooled, and consequently annealed, until passing from the outlet 11, it is removed, together with the clamp carrying it from the chains. In the meantime, the second clamp with the second bait $5^a$ has remained stationary for a short period, until the lower edge of the severed sheet above it has passed entirely out of interference therewith, and this gives the upper plastic end of the bait $5^a$ time to slightly cool and set in the clamp so that it will remain therein. As soon as the first sheet has moved sufficiently to be entirely out of the way of the second clamp, another set of hooks will have engaged the gudgeons of said second clamp, and the second sheet will be drawn. Thus it will be evident that the sheets will be successively drawn, reheated to eliminate any fractures, and finally annealed. In connection with this method, one of the important features is the combined severing and clamping of the sheet in close proximity to the molten body of glass, thereby providing a bait for the succeeding sheet. Experience has demonstrated that the glass must be cut within about eight inches of the molten mass, for if it is attempted to cut it above that point, it is so hard that it breaks, or if drawn fast enough so as to be cut above about eight inches, it is too thin. Moreover, it will be observed that as soon as cut, and the severed sheet has been elevated away from the bait behind it, it is moved horizontally. This is important, as it is not practicable to carry one sheet upwardly above the other, for if the upper sheet should break, it would destroy all below it. Furthermore it is advantageous to carry the cut sheet as rapidly as possible away from the bait behind it and to allow said bait to remain momentarily stationary for the reasons already given.

The mechanism herewith disclosed is covered by the claims in co-pending application, filed February 28, 1907, Serial No. 359,806.

Having thus fully described my invention, what I claim as new, and desire to secure by Letters-Patent, is:—

1. The method of producing glass sheets, which consists in forming a body of molten glass and producing an annealing temperature having its hottest portion directly above the molten glass, drawing successive sheets from the body upwardly directly into the hottest portion of the annealing temperature by drawing each sheet from the body, severing it in close proximity thereto, leaving a bait for the succeeding sheet, allowing said bait to remain stationary until the sheet above is in the annealing temperature and passing the sheet through said annealing temperature to the coolest portion thereof.

2. The method of producing glass sheets which consists in producing a body of molten glass and an annealing temperature having its hottest portion directly above the molten glass, drawing successive sheets from the body upwardly directly into the hottest portion of the annealing temperature by drawing each sheet from the body, severing it in close proximity thereto, leaving a bait for the succeeding sheet, carrying the severed sheet away from the bait, and subjecting its lower severed end to a heat sufficient to weld cracks or fractures therein, allowing the bait to remain stationary until the sheet above is in the annealing temperature, and passing the sheets through the annealing temperature.

3. The method of producing glass sheets which consists in drawing an upright sheet from a molten mass into an annealing temperature, severing the lower end of the sheet from the molten mass, and after said severance, subjecting the lower end to a welding temperature higher than the annealing temperature and sufficient to weld cracks or fractures caused by the severing operation.

4. The method of producing glass sheets, which consists in drawing a sheet from a molten body, severing the sheet, and reheating the severed portion.

5. The method of producing glass sheets, which consists in drawing a sheet from a molten body, severing the sheet, and passing the severed sheet through a welding heat.

6. The method of producing glass sheets, which consists in drawing a sheet from a molten body, severing the sheet, passing the severed sheet through a welding heat, and afterwards through an annealing heat.

7. The method of producing glass sheets, which consists in drawing successive sheets from a molten body, by drawing each sheet from the body, severing the same in close proximity to the body, leaving a bait for the succeeding sheet, passing the severed end through a welding heat, then drawing the succeeding sheet by means of the bait, and finally annealing the sheets.

In testimony whereof I have signed my name to this specification in the presence of two subscribing witnesses.

EUGENE MORENUS.

Witnesses:
CRANFORD GETMAN,
GEO. G. BAKER.